United States Patent [19]

Miller

[11] 4,325,822
[45] Apr. 20, 1982

[54] PET LITTER SEPARATOR

[76] Inventor: John H. Miller, 402 N. 10th St., Mantowoc, Wis. 54200

[21] Appl. No.: 172,385

[22] Filed: Jul. 25, 1980

[51] Int. Cl.³ .............................................. B07B 1/04
[52] U.S. Cl. .................................. 209/251; 209/374; 119/1
[58] Field of Search ............... 209/251, 370, 371–374, 209/342, 337, 235, 702, 703, 352, 260; 119/1; 220/4 B, 4 E, 356; 210/236

[56] References Cited

U.S. PATENT DOCUMENTS

| 789,517 | 5/1905 | Williamson | 209/37 |
|---|---|---|---|
| 1,318,289 | 10/1919 | Kemener | 209/370 |
| 1,586,974 | 6/1926 | Devlin | 209/251 X |
| 1,587,221 | 6/1926 | Eckstein | 209/372 X |
| 2,902,165 | 9/1959 | Imershein | 209/403 X |
| 3,233,588 | 2/1966 | Thomas | 119/1 |
| 3,315,417 | 4/1967 | Roberts | 209/251 X |
| 3,485,416 | 12/1969 | Fohrman | 220/4 E |
| 4,096,827 | 6/1978 | Cotter | 119/1 |

FOREIGN PATENT DOCUMENTS

| 71384 | 4/1915 | Austria | 209/370 |
|---|---|---|---|
| 2411772 | 8/1979 | France | 220/4 E |
| 190418 | 12/1922 | United Kingdom | 209/370 |

Primary Examiner—Robert Halper
Attorney, Agent, or Firm—Alter and Weiss

[57] ABSTRACT

An animal waste collection and disposal device of the type which contains a litter material into which animal waste matter is deposited including a pair of opposed receptacles. Each of the receptacles has wall portions defining a litter-receiving chamber which is open over at least a portion of one major planar face of the receptacle, with the open portion of each receptacle being in facing relation to the open portion of the other receptacle. A screen member is positioned in interposed relation between the opposed receptacles. Tracks on the screen member slidably receive the receptacles to interlockingly detachably engage the receptacles with the screen member to permit inversion of the assembled receptacles to, in turn, transfilter the granular litter material through the screen. Abutment members limit the longitudinal sliding movement of the receptacles relative to the screen member to align the receptacles relative to the screen member and relative to each other.

5 Claims, 7 Drawing Figures

PET LITTER SEPARATOR

BACKGROUND OF THE INVENTION

This invention relates to litter box arrangements for pets such as cats, and more particularly to a litter box arrangement which permits separation of the solid pet excrement from the granular litter material to permit reuse of the litter material.

A number of United States patents in the prior art show various litter box constructions for pets, particularly cats, which have as their object the separation of the solid animal waste or excrement from the granular litter to permit reuse of the litter. Some of these prior art litter box arrangements are impractical to use and expensive to manufacture since they utilize complicated constructions involving use of numerous component parts such as a multiplicity of receptacles, screen devices, and movable partitions in a single apparatus.

The following United States patents are of interest with respect to the disclosure of the present application:

U.S. Pat. No. 3,233,588—issued to Charles E. Thomas on Feb. 8, 1966, and

U.S. Pat. No. 4,096,827—issued to James A. Cotter on June 27, 1978.

The patents to Thomas and Cotter both disclose litter box constructions including two cooperating pans or receptacles and a screen adapted to be interposed between the two receptacles to permit one of the receptacles, which has a mixture of litter and solid pet excrement therein, to be positioned in inverted relation above both the interposed screen and the other receptacle, which is empty and upwardly open. This permits the granular litter material to pass by gravity from the upper receptacle through the screen to the empty lower receptacle, with the solid pet excrement being separated from the granular litter material and remaining on the upper surface of the screen, from which the excrement may then be removed.

However, the device of the Thomas patent does not use two substantially identical litter pans or receptacles as in the case of the present disclosure, but instead uses two pans of different sizes which engage each other telescopically. Furthermore, the device of Thomas requires the use of adapter members which are mounted on the separator screen structure, the adapter members defining keepers which seat the rim portion of the larger size "cover" pan.

While the patent to Cotter shows a self-cleaning cat waste disposal device having two cooperating receptacles and an interposed screen device, the structure of Cotter is otherwise quite dissimilar from that of the present application, since Cotter's two receptacles are angularly movable with respect to each other in a portable suitcase-style container.

It is thus an object of the present invention to provide an improved litter box arrangement which permits separation of the solid animal waste or pet excrement from the granular litter material to permit reuse of the litter material, in which the litter box construction is inexpensive to manufacture, is easy to use, and permits quick separation of the granular litter material from the pet excrement, with easy disposal of the separated excrement.

It is a further object of the present invention to provide an improved litter box arrangement using two substantially identical and interchangeable litter pans or receptacles adapted to be slidably engaged with a screen member interposed between the two substantially identical receptacles, to permit granular litter in one receptacle containing a mixture of the litter and the excrement to be discharged through the interposed screen into the other receptacle, with the solid pet excrement being collected on the surface of the interposed screen from whence it may be easily removed for disposal.

It is a further object of the present invention to provide an improved litter box arrangement, including a pair of substantially identical interchangeable litter pans or receptacles which are adapted to cooperate with each other and with an interposed screen member in a slidable interlocking arrangement to facilitate the inversion of the two cooperating receptacles and the interposed screen member, to affect the separation of the solid excrement from the granular litter material so as to permit reuse of the litter material.

It is a still further object of the invention to provide an improved litter box arrangement, including a pair of substantially identical cooperating litter pans or receptacles which interlockingly slidably engage an interposed filtering screen member between the two receptacles and which further includes means for accurately locating and orienting the receptacles and the interposed screen in proper relation to each other.

In achievement of these objectives, there is provided in accordance with the present invention an animal waste collection and disposal device of the type which contains a litter material into which animal waste matter is deposited. The device comprises an assembly including a pair of opposed receptacles, each of said receptacles having wall portions defining a litter-receiving chamber which is open over at least a portion of one major planar face of said receptacle. The open portion of each receptacle is in facing relation to the open portion of the other receptacle and a screen member is adapted to be positioned in interposed relation between said opposed receptacles.

First guide track means carried by and corresponding to each of the receptacles and second guide track means carried by the screen member, are utilized with said guide track means of each of said receptacles being slidably engageable with the guide track means of said screen member to interlockingly detachably engage said receptacles with said screen member. Said receptacles are positioned in opposed relation to each other on opposite vertical sides of said screen member to permit inversion of the assembled receptacles and interposed screen member to effect transfer by gravity of said litter material through said screen member from the upper inverted receptacle to the lower receptacles, with the solid animal waste material being retained on the upper surface of said screen member.

A further feature of the construction is the provision of abutment means at opposite longitudinal ends of said assembly to limit the longitudinal sliding movement of said receptacles relative to said screen to properly position said receptacles relative to said screen and relative to each other.

Further objects and advantages of the invention will become apparent in light of the present specification.

DETAILED DESCRIPTION OF THE DRAWINGS

Figure 1:
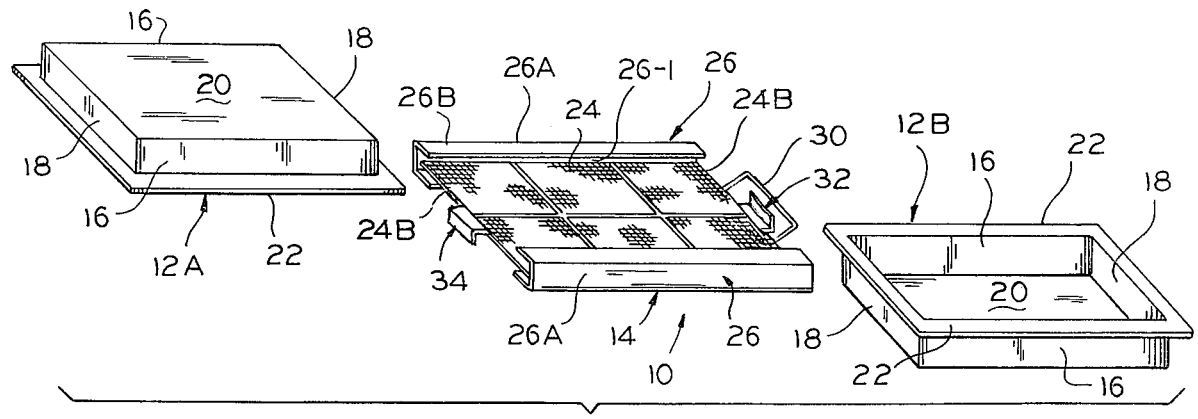
FIG. 1 is an exploded perspective view of the two cooperating litter pan receptacles and the screen subassembly which is adapted to be interposed between the two receptacles.

Referring now to the drawings, there is shown a pet litter separating assembly generally indicated at 10 comprising a pair of substantially identical litter pans respectively identical at 12A and 12B and a screen subassembly generally indicated at 14 which is adapted to be interposed between the two litter pan receptacles 12A and 12B during the litter separation operation, as will be described hereinafter. Each of the litter pans 12A, 12B is a substantially identical construction. The two litter pans may be formed of any suitable material such as metal or other appropriate material. Each of the litter pans 12A, 12B is of generally rectangular shape and includes a pair of oppositely disposed longitudinal side walls 16, transverse end walls 18, and a bottom wall 20. Each of the receptacles 12A, 12B is upwardly open and includes a peripheral flange 22 which extends around the entire perimeter of the receptacle outwardly from the upper end of the respective side and end walls 16 and 18.

Screen subassembly 14 includes a rectangular screen 24 made of wire mesh or other suitable material having openings or interstices of a size which will permit the granular litter to pass therethrough, but which will retain the solid pet excrement on the upper surface of the screen. Screen 24 has an area which is substantially equal to the area of the open upper ends of the two receptacles 12A, 12B, and includes a pair of oppositely disposed longitudinal edges each indicated at 24A, and a pair of oppositely disposed transverse end edges each indicated at 24B. Screen 24 has mounted along each of the opposite longitudinal edges 24A thereof a corresponding inwardly turned channel member 26. Each of the channel members 26 includes an outer vertical web portion 26A and laterally inwardly directed upper and lower flange portions 26B and 26C. The respective opposite longitudinal bounding edges 24A of screen 24 are suitably fixed to the inwardly facing surface of the corresponding oppositely disposed vertical web portions 26A of the opposite channel members 26 at substantially the midpoint of the height of the respective web portions 26A to define an upper channel 26-1 and a lower channel 26-2 along each of the opposite longitudinal edges of the screen subassembly.

Figures 2, 3, 4:
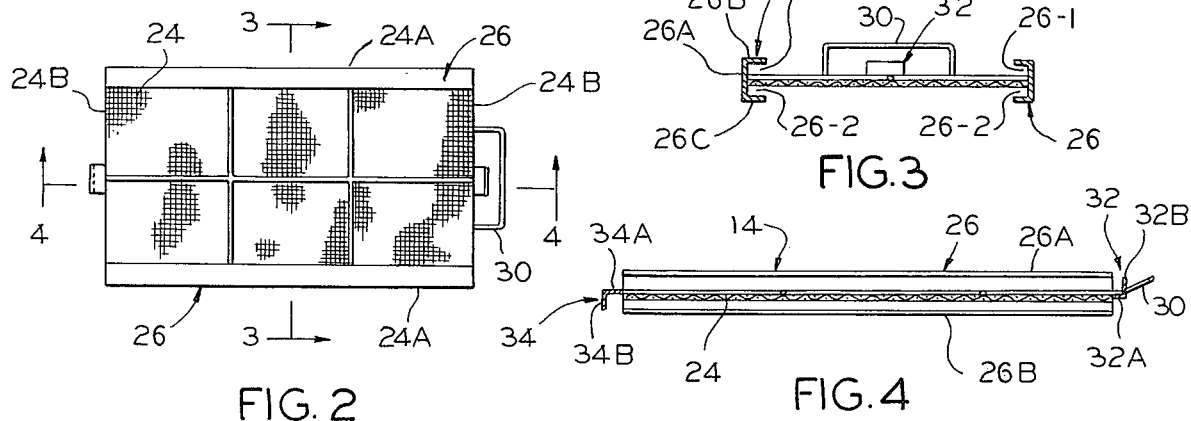
FIG. 2 is a top plan view of the screen subassembly of FIG. 1.
FIG. 3 is a view in transverse section of the screen subassembly taken along line 3—3 of FIG. 2 and looking in the direction of the arrows.
FIG. 4 is a view in longitudinal section of the screen subassembly taken along line 4—4 of FIG. 2 and looking in the direction of the arrows.

Thus, as viewed in FIGS. 1 and 3, a channel 26-1 is defined between upper flange portion 26B of each of the opposite channel members 26 and the upper surface, as viewed in FIGS. 1 and 3 of screen 24. Similarly, a channel is defined between lower flange portion 26C of each of the channel members 26 and the lower surface, as viewed in FIGS. 1 and 3, of screen 24.

The peripheral flange 22 on each litter pan 12A, 12B, and the channels 26-1, 26-2 on opposite longitudinal sides of screen subassembly 24 define cooperating guide track means on the respective litter pans and on the screen subassembly, which guide the litter pans and the screen subassembly for movement relative to each other, and which also hold these members in assembled relation relative to each other.

Separator screen subassembly 14 is provided with a handle member 30 at one end thereof which is suitably affixed to a centrally located portion of one of the end edges 24B of screen 24.

An L-shaped projection 32 is also suitably secured to the same end edge 24B of screen 24 as that to which handle 30 is secured. Projection 32 includes a horizontal portion 32A and vertical portion 32B extending upwardly from the outer end of horizontal portion 32A.

A second L-shaped projection 34 of L-shape, similar to the member 32 just described, is secured to the opposite end 24B of screen 24, and includes a horizontal portion 34A and a vertical portion 34B extending downwardly from the outer end of horizontal portion 34A.

Figure 5:
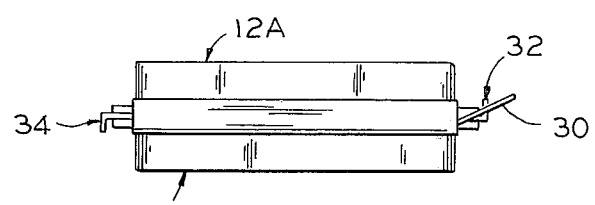
FIG. 5 is a side elevation view of the components of the litter separator assembly of FIG. 1 in assembled relation.
Figure 6:
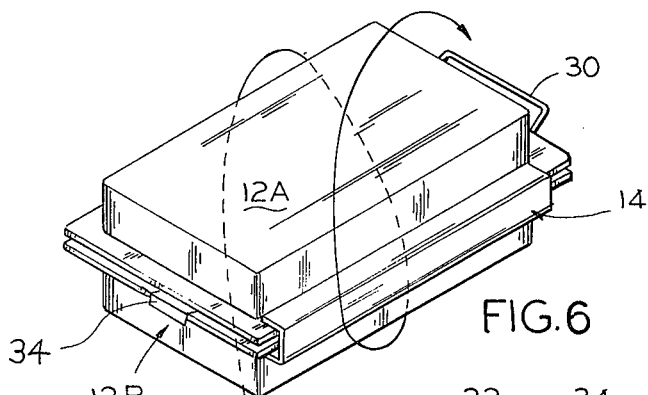
FIG. 6 is a perspective view of the litter separator assembly of FIG. 5 with directional arrows indicating inversion to accomplish the separation of the solid pet excrement from the granular litter material.

Handle 30 and the horizontal portions 32A, 34A of the respective tabs 32 and 34, project a sufficient distance beyond the corresponding end edge of screen 24 to accommodate the width (in a direction lengthwise of the assembly) of the portion of receptacle flange 22 contiguous the respective ends of screen 24 when receptacles 12A, 12B and screen subassembly 14 are in the assembled relation of FIGS. 5 and 6.

The vertical portions 32B, 34B of the respective tabs 32, 34 serve as abutments which are engaged by the end edges of receptacle flanges 22 to properly orient and locate receptacles 12A, 12B relative to screen subassembly 14 and relative to each other.

The pet litter separator litter pan 12B filled with granular litter after use by the cat or other pet, contains the pet's excrement. The granular litter which is conventionally used in pet litter boxes is absorbent and absorbs the liquid component of the pet excrement, namely, the urine, and clumps. In order to separate clumped litter and the solid excrement left by the cat or other pet from the granular litter material, the following procedure is followed:

Screen subassembly 14 is moved to the right relative to the view shown in FIG. 1 to engage the lower channel 26-2 on each of the opposite lateral sides of screen subassembly 14 with peripheral flange 22 of the upwardly open filled litter pan 12B. After having initially engaged lower channel 26-2 of screen subassembly 14 with flange 22 of litter pan 12B, subassembly 14 is pulled by handle 30 to the right until the vertically downwardly depending portion 34B of tab-like projection 34 at the left-hand end of screen subassembly 14 engages the left-hand edge of flange 22 which paralles left-hand side wall 18 of pan 12B.

With screen subassembly 14 fully engaged with litter pan 12B and with screen 24 completely covering and coextensive with the upwardly open end of the filled litter pan 12B, the second litter pan 12A, in inverted position as seen in FIG. 1, is engaged with screen assembly 24 by moving flange 22 of litter pan 12A along the length of the oppositely disposed upper channels 26-1 of screen subassembly 14 until the edge of flange 22 abuts against the upwardly turned portion 32B of tab-like projection 32 at the right-hand end of screen subassembly 14, relative to the view shown in FIG. 1. When this occurs, litter pan 12A is properly positioned in overlying relation to screen 24 of separator subassembly 14, and the two litter pans 12A, 12B, and the interposed screen subassembly 14 are in properly assembled relation to each other, as seen in FIG. 5 of the drawings.

The assembly of the two litter pans 12A, 12B, and the interposed separator screen subassembly 14 as seen in FIG. 5 is then inverted or turned over 180 degrees as indicated in FIG. 6 of the drawings. After inverting the separator assembly 10 as indicated in FIG. 6, the inverted assembly is given a few rapid shakes which causes the unclumped, still useable granular litter material, which is in the now inverted full litter pan 12B, to pass through screen 24 and into the previously empty litter pan 12A, which is now beneath litter pan 12B. As best seen in the view of FIG. 7, the solid excrement and clumped litter is collected on the upper surface of screen 24 while the granular litter material has passed through the mesh of the screen and is in the now lower and upright litter pan 12A.

Figure 7:
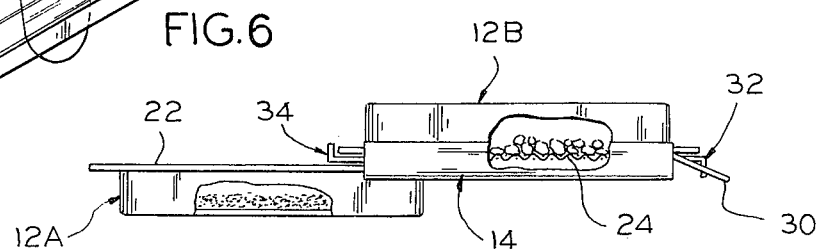
FIG. 7 is a side elevation view, partially broken away, showing the litter separator assembly of FIGS. 5 and 6 in the inverted position and with the screen subassembly having the solid excrement deposited theron, together with the now upper receptacle being slidably removed from the now lower receptacle which contains the separated granular litter material.

After the separation operation has occurred as just described, in order to dispose of the excrement which has collected on the upper surface of screen 24, the now lower and full litter pan 12A is grasped, and the handle 30 of screen subassembly 14 is pulled to the right relative to the view of FIG. 7 to cause inverted litter pan 12B to move together with screen subassembly 14 as seen in the view of FIG. 7, until the upright and now full litter pan 12A has become disengaged from the channels 26-1 of screen subassembly 14. The engagement of vertical tab portion 34B on screen 24 with receptacle 12B causes receptacle 12B to move with screen 24 when handle 30 is pulled.

The excrement supported on screen 24 can be disposed of by inverting back to their upright positions, screen subassembly 14 and connected litter pan 12B which have now been removed from their connection to litter pan 12A. Screen subassembly 14 can then be slidably removed from the now upright litter pan 12B and the excrement, which has fallen back into litter pan 12B may be dumped out of litter pan 12B to complete the separation and disposal operation.

The whole operation hereinbefore described can be completed efficiently and expeditiously and, moreover, without personally contacting the disposed of wastes.

From the foregoing detailed description of the invention, it has been shown how the objects of the invention have been obtained in a preferred manner. However, modifications and equivalents of the disclosed concepts such as readily occur to those skilled in the art are intended to be included within the scope of the invention.

What is claimed is:

1. An animal waste collection and disposal device of the type which contains a litter material into which waste matter is deposited, said device comprising:
   an assembly including a pair of opposed substantially rectangular shaped receptacle members,
   each of said receptacle members having wall portions defining a litter-receiving chamber which is open over at least a portion of one major planar face of said receptacle, with the open portion of each receptacle being in facing relation to the open portion of the other receptacle;
   a substantially rectangular shaped screen member adapted to be positioned in interposed relation between said opposed receptacles;
   first guide track means carried by and corresponding to the longitudinal sides of each of said receptacles;
   second guide track means carried by said screen member on both opposite sides of said screen member along its longitudinal edges;
   said first guide track means of each of said receptacles being slidably engageable along the longitudinal direction with respective ones of said second guide track means of said screen member respectively to interlockingly and detachably engage said receptacles with said screen member in opposed relation to each other on said opposite sides of said screen member,
   said second guide track means protruding outwardly from between said respective ones of said side track means when said screen member is removably attached therebetween, whereby substantially sealed inversion of the assembled receptacles and interposed screen member transfers by gravity said litter material through said screen member from the upper inverted receptacle to the lower receptacle, with said waste matter being retained on the upper surface of said screen member.

2. The animal waste collection and disposal device as defined in claim 1 in which said second guide track means comprises a channel means and said first guide track means comprises a flange engageable with said channel means.

3. The animal waste collection and disposal device as defined in claim 1 in which the first guide track means carried by each of said receptacles is a flange,
   said second guide track means carried by said screen comprising first pair of superposed channels and a second pair of superposed channels extending along an opposite edge of said screen, extending along an opposite edge of said screen,
   one channel of each of said pairs of channels lying above said screen and the other channel of each of said pairs of channels lying below said screen, whereby the flange of one of said receptacles is engageable with said one channel of each of said pairs of channels and the flange of the other of said receptacles is engageable with said other channel of each of said pairs of channels respectively.

4. An animal waste collection and disposal device as defined in claim 1 including first and second abutment means respectively positioned at opposite longitudinal ends of said screen assembly to limit the movement of said receptacles relative to said screen assembly,
   said first abutment means at one end of said assembly on one side of said screen to limit the movement of one of said receptacles,
   said second abutment means at the opposite end of said assembly on another side of said screen to limit the movement of the other of said receptacles.

5. The animal waste collection and disposal device as defined in claim 1 in which said screen member has a handle secured thereto to facilitate sliding longitudinal linear movement of said screen member relative to each of said receptacles.

* * * * *

UNITED STATES PATENT AND TRADEMARK OFFICE
CERTIFICATE OF CORRECTION

PATENT NO. : 4325822
DATED : April 20, 1982
INVENTOR(S) : John H. Miller

It is certified that error appears in the above—identified patent and that said Letters Patent are hereby corrected as shown below:

Col. 3 line 31   "identical" should be instead --indicated--

Signed and Sealed this

Sixth Day of July 1982

[SEAL]

Attest:

GERALD J. MOSSINGHOFF

Attesting Officer   Commissioner of Patents and Trademarks